United States Patent [19]
Treher

[11] 3,778,143
[45] Dec. 11, 1973

[54] REMOTE CONTROLLED SLIDE CHANGER FOR OVERHEAD PROJECTOR

[76] Inventor: James E. Treher, 609 Oxford Blvd., Pittsburgh, Pa. 15234

[22] Filed: Feb. 5, 1973

[21] Appl. No.: 329,537

[52] U.S. Cl..................... 353/111, 353/113, 353/98
[51] Int. Cl. .......................................... G03b 23/06
[58] Field of Search....................... 353/98, 99, 120, 353/108, 111, 112, 118, 122

[56] References Cited
UNITED STATES PATENTS

| | | | |
|---|---|---|---|
| 3,110,217 | 10/1963 | Millner | 353/112 |
| 3,476,474 | 11/1969 | Nerwin | 353/108 |
| 3,642,359 | 2/1972 | Kitch | 353/98 |

Primary Examiner—Louis R. Prince
Assistant Examiner—A. J. Mirabito
Attorney—William H. Parmelee

[57] ABSTRACT

A remotely-controlled transparency slide changer moves a stack of slides on a spindle in an arc from a position clear of the top of the light box of an overhead projector to a position over the light box, releases the lowermost slide from the stack and returns to its starting position while at the same time a sweep arm moves in the reverse direction to remove a previously exhibited slide from a position over the top of the light box to a position where said slide is clear of the light box and slides down the said spindle into a receiving tray. The upper part of the spindle non-rotatably but slidably receives each of the slides in the stack but the lower part of the spindle is slidably and rotatably received in the exhibited slides.

9 Claims, 11 Drawing Figures

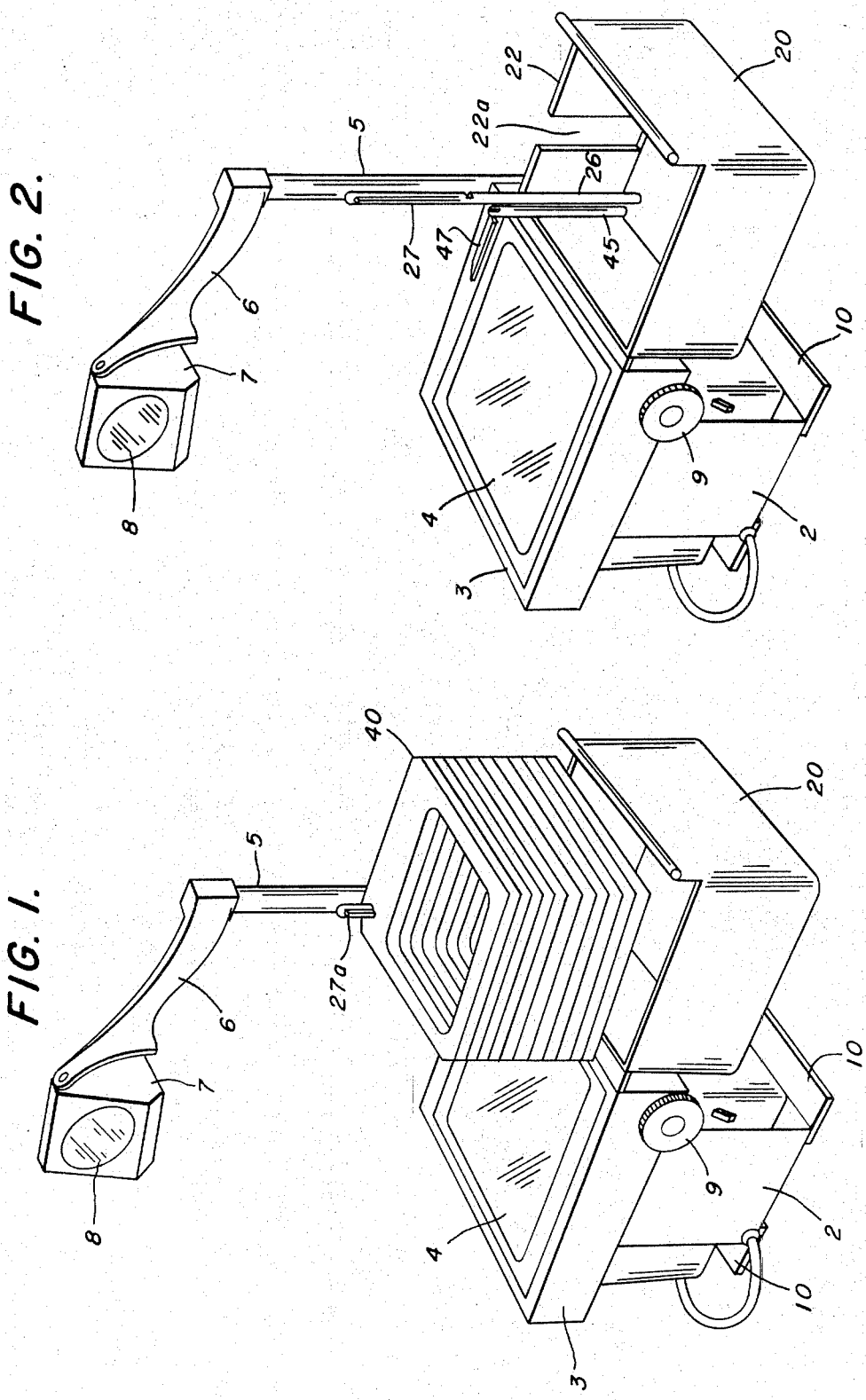

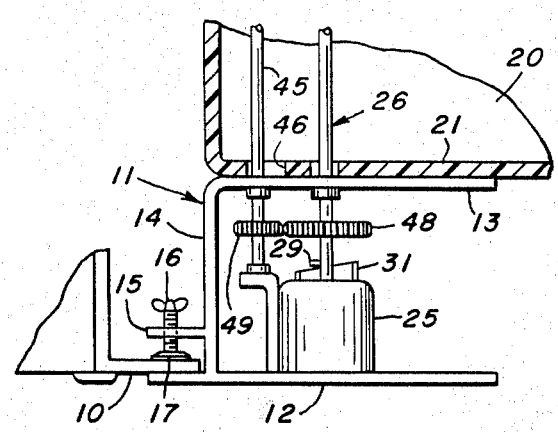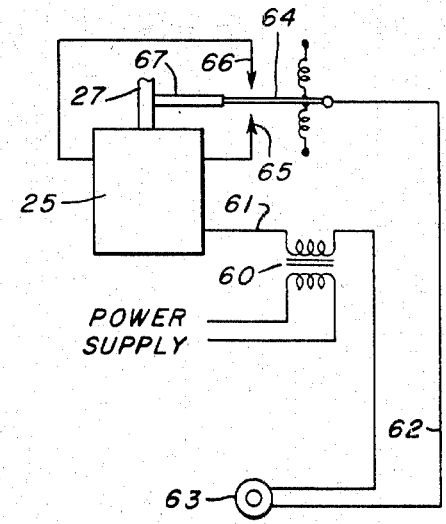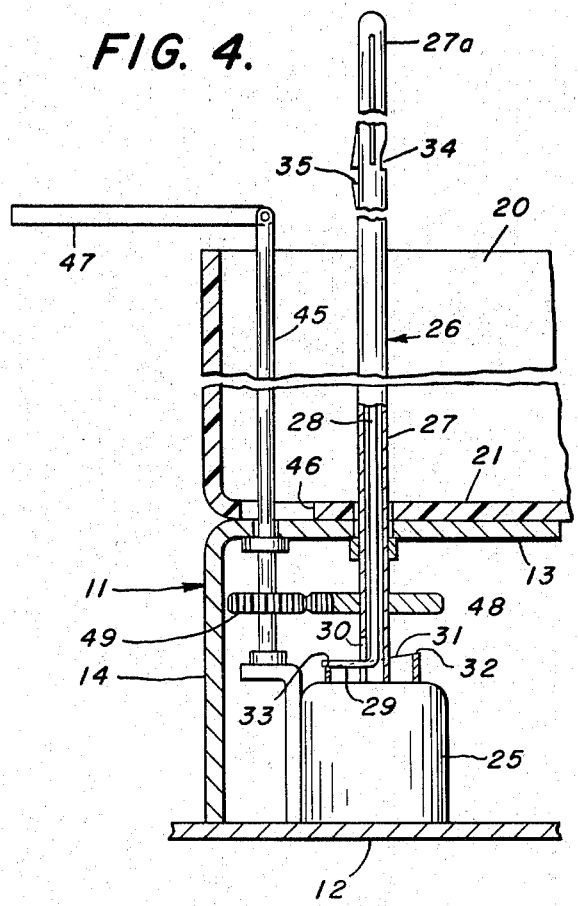

PATENTED DEC 11 1973 3,778,143

REMOTE CONTROLLED SLIDE CHANGER FOR OVERHEAD PROJECTOR

This invention is for a projector of a type commonly used for visual education, visual group instruction and like purposes, and more particularly provides for use with such a projector a remote controlled transparency or slide changer.

BACKGROUND OF THE INVENTION

In an overhead type of projector to which this invention relates, there is typically an enclosed light box with a light-transmitting top. The slide or transparency to be projected is customarily a letter-size, or larger, sheet that is positioned on top of the box, and on which there may be printing, or a drawing, or diagram, or the like. The light which shines up from the box and passes through the transparency, which for convenience will hereinafter be termed a "slide," although it is quite unlike the conventional small photographic slide commonly used in horizontal projectors. The light, emerging from the slide, is collected by a lens or prism arrangement adjustably positioned above the top of the box and projected horizontally against a screen, where the indicia or other image on the slide is enlarged and easily viewed by a group. Such a projector makes possible the enlarged showing of various types of information, comparative illustrations, and other material without the preparation of conventional miniature photographic slides. One objection to such projectors is that, unlike the more familiar horizontal projector, automatic slide changers remotely operated by a speaker have not to my knowledge been provided. I am aware that slide or transparency changers for this purpose have heretofore been disclosed in patents, but I am unaware of any of them being commercially available, and I believe this is due to various reasons of a practical nature.

Without a remotely controlled slide changer the speaker must stand behind the projector with his back to the audience or a considerable portion of it, since the projection range of such instruments does not permit their location at any great distance from the screen.

This present invention has for its purpose to provide a relatively simple slide changer for overhead projectors which can be attached to the projector with little difficulty and which may be remotely controlled so that the speaker may be close to the screen or at a podium where he may face his audience or otherwise be to the side of the line of vision of the audience to the screen.

BRIEF DESCRIPTION

According to the present invention a vertical spindle or shaft at one corner of the light box supports a stack of slide units or transparencies, one above the other, much in the manner that a stack of record disks are mounted on a spindle of an automatic record changing phonograph spindle, but the spindle in this instance, unlike the spindle of a record changer, passes through holes in a corner of each of the slides. The stack of slides is normally at one side of the light box. When the operator presses a button, the spindle will rotate 90°, bringing the stack of slides squarely over the light-emitting top of the box. At this time the lowermost slide in the stack is released in the same manner that the lowermost record on the stack in a record changing phonograph is released, and upon being so released slides down onto the top of the light box in position to be projected. The spindle then automatically reverses to remove the remaining slides in the stack from above the light box, but the slide which has dropped remains on the box. This is accomplished by having the holes in the corner of the slide non-circular or with keyways and with the section of the spindle above the point of release of a matching cross-section, but with the shaft or spindle being of a circular or other section below the point of release, so that the remainder of slides in the stack yet to be viewed always turns with the spindle but the spindle may rotate relative to each slide after it has been dropped. The slide itself preferably comprises a unique holder for the transparency so that the slides are sufficiently stiff or rigid to avoid binding on the spindles or sagging.

After the first slide has been viewed it must be moved out of the way before a second one is released. To accomplish this, there is a second short spindle or shaft with a horizontal wiping or sweep arm pivoted to it, and the second shaft is geared to the first shaft to rotate always in a direction opposite the direction of rotation of the first spindle. As the first spindle rotates in a direction to move the stack back over the light box, the sweep arm will move in the reverse direction to sweep the first slide off the top of the light box where this slide so brushed away is then free to slide down the first shaft into a tray. As each slide in turn is released from the bottom of the stack above, it drops onto the top of the stack which accumulates below, keeping the slides in the same order. When all the slides of the original stack have been viewed, they may be removed and replaced with another stack.

BRIEF DESCRIPTION OF DRAWINGS

This invention may be more fully understood by reference to the accompanying drawings showing a preferred embodiment of my invention, but dimensions in some views may vary from other views for clarity of illustration, and wherein:

FIG. 1 is a perspective view showing the slide changer with a stack of slides applied to a well-known type of overhead projector;

FIG. 2 is a similar view with the stack of slides removed;

FIG. 3 is a fragmentary front elevation of the machine shown in FIGS. 1 and 2 showing one arrangement for attaching the slide changer to the projector, a portion only of the machine and tray being shown;

FIG. 4 is a side elevation on a larger scale of the apparatus as shown in FIG. 3 with the tray and motor housing in section;

FIG. 5 is a fragmentary plan view on a larger scale showing the relation of the two shafts or spindles and the slide sweep arm arrangement;

FIG. 6 is a schematic wiring diagram for the motor;

Figure 8:
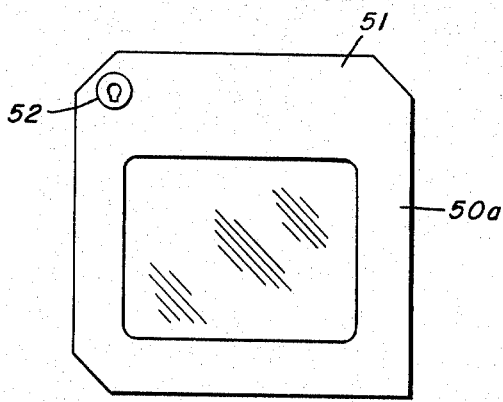
FIG. 8 is also a plan view of a single slide with the exhibit crosswise instead of lengthwise as in FIG. 7.

In the accompanying drawings I have, for purposes of illustration, disclosed one well-known type of overhead projector to which the invention is adapted, and it should be understood that certain modifications in hardware of the present invention may be necessary with projectors of other makes which are not of exactly the same contour. For the purposes of describing this invention, they are essentially the same.

The projector itself as here illustrated comprises a generally cubical light box 2 having an enlarged frame portion 3 around its top. It has a light-transmitting or translucent top 4 mounted in the frame 3. There is a post 5 on what may be termed the rear side of the frame on which is an arm 6 supporting the projector 7 which is arranged to gather light projected upwardly through the light-transmitting top 4 and project it horizontally through a projection lens 8. A knob 9 accessible at the front of the machine serves to raise or lower the post 5 for focusing purposes. The box has or may be provided with laterally extending base flanges 10 along each side thereof and in the environment here shown this base flange provides for the attachment of the automatic slide changer of the present invention to the light box.

As most clearly shown in FIG. 3, there is a bracket-like housing element designated generally as 11 having a bottom 12, a top 13, and an end wall 14. The bottom plate 12 at the left of the housing element as shown in FIG. 3 projects beyond the vertical wall 14 and there is a lip 15 spaced above this projecting portion of the base which carries a clamping screw arrangement 16 having a pad 17 at its lower end. The base flange 10 at the right side of the projector box extends under the overhanging lip 15 and by turning the thumb screw arrangement 16, the housing assembly 11 can be clamped to the base flange of the projector unit.

A deep tray 20 is removably set on this bracket with its top edge level with or below the light box. It has a bottom 21 and side and end walls, the rear end wall 22 having a deep finger-slot for convenience in removing a stack of slides after they have been exhibited, as will be hereinafter more fully understood.

Contained within the bracket-like housing element 11 is a low speed reversible motor 25 that drives a composite spindle or shaft 26 having an outer sleeve 27 and an inner vertically reciprocable shaft 28 with an arm 29 that extends radially through a vertical slot 30 in the sleeve. The terminal of the arm 29 rides on the surface of a circular or semi-circular cam 31 having a high point 32 with a surface that slopes toward a low point 33 which is 90° removed from the high point.

The top portion 27a of the shaft 27 is non-circular in section or has a longitudinal key that extends down to an offset at 34 and the inner shaft 28 operates a slide-dropping mechanism at 35 which is similar to mechanisms used on conventional record changing phonographs for successively dropping the lowermost record in a stack onto a turntable while the ones above are supported from dropping, devices of this kind being well known in the art. When the shaft 26 with its sleeve 27 and rod 28 are at one limit of rotation, the arm 29 is at the lowermost position on the cam 31, but as the shaft rotates 90° this arm rides to the highest point on the cam 31, tripping the release mechanism at 35 to drop a slide, as hereinafter described, while supporting the remaining ones above.

In FIG. 1 a stack 40 of these slides, to be hereinafter described in detail, but which are generally square, are shown on the upper portion 27a of the shaft or spindle 27 in a position which they normally occupy over the tray 20 when the shaft is at one limit of its rotation and the arm 29 is at the lowest position on the cam 31. Each slide has a non-circular hole or keyway in one corner, so that when the shaft rotates 90° clockwise from the position shown in FIG. 1 the stack of records is then centered over the light box.

The bracket-like housing 11 also supports a second vertical shaft 45 which is parallel with the composite shaft 26 and which passes up through an enlarged opening at 46 in the bottom of the tray. This second shaft has a sweep arm 47 pivoted to its upper end so that it normally extends horizontally over the top of the light box. The vertical axis of the shaft 45 is so located on a diagonal line extending from the axis of composite shaft 26 generally toward the nearest corner of the light box so that the sweep arm can swing horizontally from a normal position where its straight edge 47a, which I term its forward edge, is about parallel with and just clear of the rear edge of a slide which is in position on top of the light box to be exhibited through an arc of at least 90° and preferably a little more than 90° to a second position where it is parallel, or slightly past being parallel with that side of the tray 20 which is close against the side of the light box. The rear edge of the sweep arm comprises a wedgelike segment 47b or trailing extension of such shape and dimension as to extend well in toward and preferably never entirely clear the edge of the glass top of the light box.

The outer sleeve 27 of the composite shaft 26 has a gear wheel 48 fixed thereon and this gear wheel meshes with a gear wheel 49 fixed on the shaft 45, or is otherwise arranged to be rotated when the shaft 26 is rotated through an arc of at least 90° or slightly more, perhaps 100°, but in the opposite direction. This is indicated by the gear wheel 49 being slightly less in diameter than gear 48, but where space does not permit, the gearing may be otherwise arranged.

Figure 7:
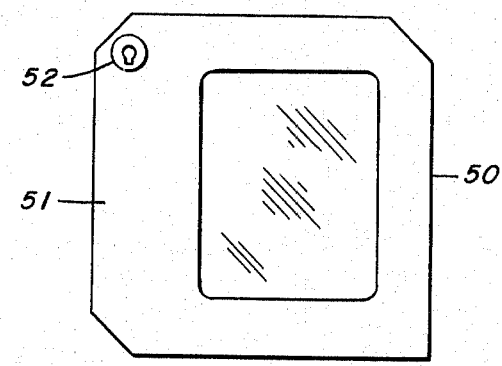
FIG. 7 is a plan view of a single slide.
Figure 10:
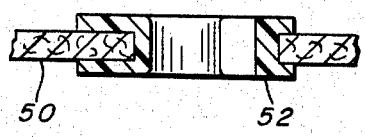
FIG. 10 is a transverse section through FIG. 9.
Figure 9:
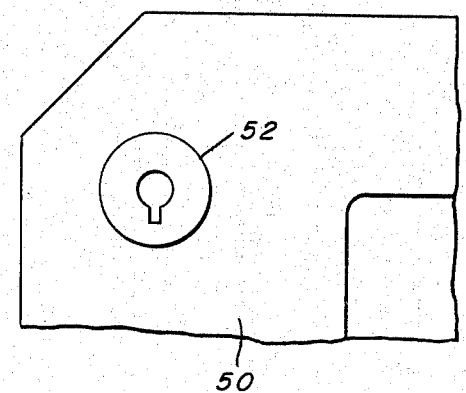
FIG. 9 is a corner detail of a slide with a non-circular eye or grommet.

The slides are desirably made of slightly stiffer material than those now commonly used, or they may be the same, and each one is then mounted in a separate adapter. Usually each slide has a four-sided opaque cardboard frame from which three corners are cut away. The subject to be illustrated is reproduced on a transparent "acetate" or similar film and a thin adhesive tape at the corners and along the sides. With the present invention the same structure may be followed, but instead of the open space in the frame being concentric, the card of the present invention, in addition to being formed of a stiffer or less flexible material, is made as shown in FIG. 7 where the frame 50 for a transparency that is vertical is square, but the area for receiving the transparent sheet is located so that one side 51 is wider than the other three sides and the bottom strip is slightly wider than the top one. In FIG. 8 the frame 50a for a transparency that is viewed lengthwise has the opening elongated horizontally as viewed in this figure in contrast to the vertical elongated space within the frame 50 of FIG. 7. In each case the opening in the frame is desirably the same distance from the top of the frame. Each frame has a grommet or eyelet 52 in the upper right-hand corner as viewed in these figures, the grommet having a non-circular opening or keyway therethrough so that the frames or slides will be received on the upper portion 27a of the post or shaft 27 as previously described. As previously described they will not rotate relative to said portion but will freely rotate on the lower portion 27 of this shaft. In FIGS. 9 and 10 these eyelets or grommets 52 are shown in enlarged detail.

Figure 11:
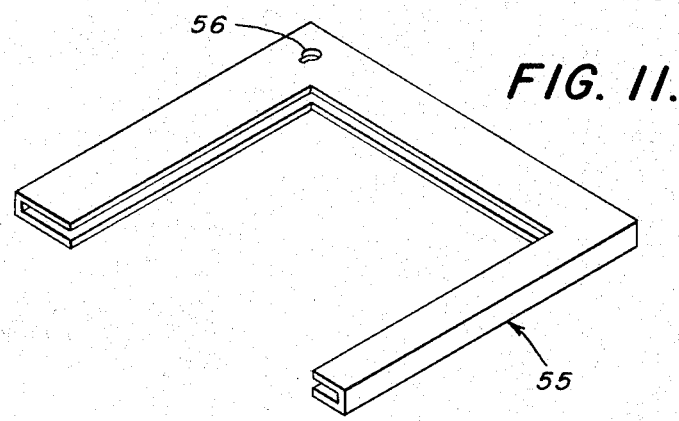
FIG. 11 is a perspective view of a slide holder.

In place of forming the slides or cards with an eyelet in this manner, an adapter in the form of metal or plastic holder 55, such as that shown in FIG. 11 may be used. A cardboard frame with its transparency may be removably received or held by one of the holders, there being one holder for each card or slide in the series to be exhibited. The holder has an opening 56 through one corner so that it is non-rotatable but held on the shaft extension 27a but slidable and rotatable on the sleeve shaft 27 below the release 35. The term "slide" or "slide unit" as used herein is intended to mean either the transparency itself with the frame in which it is mounted, or the mounted transparency and holder, unless otherwise specified.

Referring to FIG. 6, a remote control circuit for the reversing motor 25 is schematically indicated. The power for operating the motor may be derived from the same source of power to which the lights in the light box are connected, as indicated by the transformer 60. One slide 61, of the transformer secondary is connected with the motor and the other side is connected through an extension cord 62 and a push-button 63 with a toggle or snap-over type of switch 64, one contact 65 of which leads to the motor to drive it in one direction, and the other contact 66 of which connects to the motor to drive it in the opposite direction. The switch may be operated by some well-known device built into the motor or, as here indicated, by being in the path of movement of an arm 67 extending radially from the shaft 27.

The operation is as follows: The stack of slides on the portion 27a of the shaft 27 is normally over the tray 20 at the side of the light box. Starting with the first slide, the exhibitor presses button 63, energizing motor 25 to rotate the composite shaft 26–27a which rotates the stack of records 90° to a position over the light box at the same time moving the sweep arm 47 over the top of the light box in the opposite direction until its edge 47a is above the tray 20. As this takes place, arm 29 rides up the cam 21 so that when the stack of slides reaches its furthese limit of travel with the stack properly centered above the glass top 4 of the light box, the lowermost slide will be released by the mechanism 35 and dropped into position over said glass. However one edge will fall on the wedge-like segment 47b of the sweep arm 47. As the slide is dropped in the manner described, and with the circuit still energized, switch 64 snaps to the reverse position and the shaft 26– 27 swings back to itd normal position under the tray while the sweep arm slides back under the slide to its normal position, allowing the slide to drop down where it is then flat and in focus to be exhibited. At this time the operator releases the push-button switch, and reversing switch 64 at this time will then be reset for the next cycle. When he wishes to exhibit the next slide, the operator again pushes the button, but on this and succeeding cycles the straight edge 47a of the sweep arm will hit the back edge of the slide that he has just shown and push it, counter to the direction in which the stack is rotating through an arc where that slide will drop off into the tray, of course sliding down the sleeve shaft 27. Each slide in turn is exhibited in this fashion and when the stack is completed, the operator lifts all of the slides as a group up and off the composite shaft 26 with its upper portion 27a. All of the records will then be in the order in which they were exhibited. The finger slot 22 in the tray facilitates this removal of the stack of exhibited slides.

If at any time the entire tray is to be removed, it is simply raised up to clear the top of portion 27a and because of the sweep arm being pivoted, and with an adequate opening in the bottom of the tray, the tray will raise the sweep arm to a vertical position and clear it.

I claim:

1. For use with an overhead type of projector, a remote controlled slide-changing attachment comprising:
   a. a support structure arranged to be mounted alongside the light box of an overhead projector wherein the light bod has a light-transmitting cover glass and a frame at the top around the cover glass,
   b. a reversible motor-driven spindle on the support positioned to project vertically up at one corner of the light box, the spindle having an upper end portion projecting above the level of the top of the box arranged to pass through the corner portions of and support a stack of slide units with visual subject-matter to be exhibited with the lowermost slide unit above the level of the top of the light box and with the slide units being non-rotatable on the spindle, the lower portion of the spindle below the top of the light box being so arranged that the spindle rotates freely relatively to the slide units,
   c. a reversible motor for rotating the spindle through an arc between a position where the stack of slide units on the upper portion of the spindle is between a first position clear of the light box and a second position where said stack is squarely over the top of the light box,
   d. means operable with the rotation of the spindle to the second position for releasing the lowermost slide unit in the stack to move down the spindle onto the lower portion of the spindle with the slide unit coming to rest on the top of the light box where it is positioned for visual subject-matter on the slide to be projected, and
   e. means operated by the motor for removing a previously exhibited slide unit from off the top of the light box to a position at one side of the light box where it is free to move down the lower portion of the spindle and remain stationary while other slide units on the spindle are being similarly cycled.

2. The invention defined in claim 1 in which there is a tray at one side of the light box through a corner of which said spindle extends, the tray being in a position to receive the slide units when they are moved off the top of the light box and are free to move down the spindle whereby they are collected in the tray.

3. The invention defined in claim 1 in which said last-named means moves the slide from off the top of the light box simultaneously with the movement of the stack toward said second position.

4. The invention defined in claim 3 in which said means for moving each slide unit in turn after it has been exhibited from off the top of the light box comprises a second spindle parallel with the first with a horizontally extending sweep arm fixed thereto for rotation therewith and gearing for reversing the direction of rotation of the second spindle relatively to the first between a starting position and a position where it will have removed the slide unit off the top of the light box.

5. Apparatus as defined in claim 4 in which said sweep arm is segment-shaped with a leading edge arranged to contact an edge of the slide unit and with a trailing edge, the sweep arm being so positioned on its spindle that when it has reached a position where the slide unit which has been exhibited has moved off the light box the trailing edge of the sweep arm will be in a position where the next slide moving down into place will overlap said trailing edge to enable the sweep arm to return to its starting position by moving under the slide which has thus moved down.

6. Apparatus as defined in claim 1 wherein said support is removably clamped to the light box.

7. Apparatus as defined in claim 1 wherein the upper portion of the spindle is non-circular in section and each slide unit has a spindle-receiving opening in one corner arranged to slidably but non-rotatably engage the spindle whereby the stack of slide units will rotate with the shaft and will slide down said spindle as the lowermost one drops away to be exhibited.

8. Apparatus as defined in claim 7 wherein each slide unit comprises a transparency on which is the visual subject-matter to be projected, a frame around the transparency and a holder in which the frame with its transparency is removably received and supported, the holder having the hole therethrough into which the upper portion of the spindle is non-rotatably fitted.

9. Apparatus as defined in claim 1 wherein there is an electric circuit including a push button switch for initiating the operation of the motor to move the stack from the first to the second position and a motor-actuated switch for reversing the motor after a slide unit has been released from the bottom of the stack onto the light box and return the stack to its first position with the stack clear of the space above the light box.

* * * * *